US007702835B2

(12) United States Patent
Riethmuller (10) Patent No.: US 7,702,835 B2
(45) Date of Patent: Apr. 20, 2010

(54) TAGGED INTERRUPT FORWARDING

(75) Inventor: Paul A. Riethmuller, Annerley (AU)

(73) Assignee: Oracle America, Inc., Santa Clara, CA (US)

(*) Notice: Subject to any disclaimer, the term of this patent is extended or adjusted under 35 U.S.C. 154(b) by 874 days.

(21) Appl. No.: 11/050,076

(22) Filed: Feb. 3, 2005

(65) Prior Publication Data

US 2006/0212607 A1 Sep. 21, 2006

(51) Int. Cl.
*G06F 13/24* (2006.01)
(52) U.S. Cl. ........................ 710/260; 712/244
(58) Field of Classification Search ............... 710/268, 710/260; 711/171; 712/28, 31, 244
See application file for complete search history.

(56) References Cited

U.S. PATENT DOCUMENTS

| | | | | |
|---|---|---|---|---|
| 5,317,747 | A * | 5/1994 | Mochida et al. | 710/260 |
| 5,560,019 | A * | 9/1996 | Narad | 710/260 |
| 6,065,088 | A * | 5/2000 | Bronson et al. | 710/263 |
| 6,219,743 | B1 * | 4/2001 | Kennel et al. | 710/260 |
| 6,247,091 | B1 * | 6/2001 | Lovett | 710/260 |
| 6,711,643 | B2 * | 3/2004 | Park et al. | 710/260 |
| 6,789,142 | B2 | 9/2004 | Diamant | |
| 6,877,057 | B2 | 4/2005 | Alexander et al. | |
| 6,880,021 | B2 | 4/2005 | Easton et al. | |
| 2004/0019723 | A1 * | 1/2004 | Ostrovsky et al. | 710/260 |

FOREIGN PATENT DOCUMENTS

WO 02/015470 2/2002

OTHER PUBLICATIONS

IBM, "Storage Virtualization Tutorial", 2003, IBM Corporation.*
Ian Kaplan, "Memory Allocation and Garbage Collection", Dec. 2001— http://www.bearcave.com/software/garbage.htm.*
"82093AA I/O Advanced Programmable Interrupt Controller (IOAPIC)," Intel Corporation, pp. 20, 1996.
*Writing Device Drivers*, Chapter 14, "SCSI Target Drivers," Sun Microsystems, pp. 4, 1994-2002.
Combined Search and Examination Report application No. GB0602248.7 mailed May 25, 2006.

* cited by examiner

*Primary Examiner*—Henry W. H. Tsai
*Assistant Examiner*—Elias Mamo
(74) *Attorney, Agent, or Firm*—Meyertons, Hood, Kivlin, Kowert & Goetzel, P.C.; B. Noel Kivlin (57) ABSTRACT

A system for tagged interrupt forwarding comprises a multiprocessor including a first and a second processor, an I/O device, and I/O management software. In response to an application I/O request, the I/O management software may be configured to prepare a request descriptor at the first processor, including an identification of the first processor. The I/O management software may then send a hardware or device-level I/O request to the I/O device. When the I/O device completes the requested hardware I/O operation, it may send a response, which may be received at the second processor. I/O management software at the second processor may be configured to transfer control for processing the response back to the first processor at which the I/O request was initiated, using the tag to identify the first processor. Processing of the response may then be completed at the first processor.

27 Claims, 6 Drawing Sheets

TAGGED INTERRUPT FORWARDING

BACKGROUND OF THE INVENTION

1. Field of the Invention

This invention relates to the field of computer systems and, more particularly, to input/output (I/O) operations in multi-processor systems.

2. Description of the Related Art

Processing associated with an I/O operation in a computer system may logically be divided into two parts. A first part may include preparation and dispatch of a device-level I/O request to a hardware I/O device in response to a read or write request from an application. A second part may include receiving and processing a response from the hardware I/O device and returning a completion indication to the application. The first part may be termed "request processing", while the second part may be termed "response processing". Other terms such as "top half" processing or "kernel context" processing may also be used to describe part or all of the first part of the processing in operating systems literature, while terms such as "bottom half" processing or "interrupt context" processing may also be used to describe part or all of the second part of the processing.

Several layers of an operating system may be traversed during both request processing and response processing. Various data structures may be accessed at each layer. For example, an application thread or process may invoke a system call for the read or write request. A file system may translate the read or write system call to a block address within a block device, and may prepare a first data structure (such as a block request header or a "buf" structure in some UNIX™-like operating systems) including a pointer to a buffer for storing the data corresponding to the I/O request. The first data structure may also be used for storing the state of the request, for specifying various parameters for the request (e.g., whether direct I/O to a user buffer is being requested), and for specifying a routine to be invoked when the I/O response is received (which may be termed an "I/O Done" routine). A pointer to the first data structure may then be passed to one or more additional layers of the operating system (such as a volume manager layer), each of which may in turn reference additional data structures including layer-specific information. Eventually (i.e., either by the file system or by some other intermediate layer), a device driver entry point (such as a "strategy" routine in some UNIX™-like operating systems) may be invoked. The device driver entry point may interpret the contents of the first data structure (and/or additional data structures) to prepare a device-level, I/O protocol-specific request descriptor for the I/O request, and enqueue or issue a device-level request for the I/O hardware.

Once the I/O hardware has performed the device-level I/O operation, the I/O hardware may generate a response such as an interrupt signal. An interrupt handler within the operating system may begin response processing. The layers of the operating system traversed during request processing may then be traversed in reverse order, with the various data structures being referenced (i.e., accessed and/or updated) at each corresponding layer. In some cases (e.g., for some read operations), one or more buffers filled by the I/O device may be copied to other buffers, such as a user-level buffer. Response processing may also include cleaning up certain data structures (e.g., by deallocating the data structures or by returning the data structures to a free pool) that may have been used during request processing.

In a uniprocessor system, both request processing and response processing are performed (by necessity) at the same processor. If the uniprocessor system includes a cache hierarchy (e.g., one or more levels of data cache, instruction cache or combined data and instruction cache), the various data structures described above may be brought into the cache hierarchy during request processing. A subset or all of the data structures may remain in the cache hierarchy when response processing occurs, especially if the device-level I/O operation is completed in a relatively short time. Therefore, response processing may benefit from the presence of the data structures in the cache hierarchy (i.e., relatively expensive memory accesses may be avoided during references to the data structures).

In multi-processor systems, on the other hand, request and response processing may be handled by different processors. For example, a first processor may receive the application's I/O request and perform the request processing, but a second processor may receive the interrupt signal and perform the response processing. In such cases, the data structures that may be referenced during response processing may remain in a cache hierarchy at the first processor, and may not be present in a cache hierarchy at the second processor at the time response processing begins. The second processor may therefore encounter cache misses during response processing, which may require data to be transferred between main memory and the cache hierarchy of the second processor or between cache hierarchies of the two processors. Such cache misses may result in decreased system efficiency. A mechanism to reduce the likelihood of such cache misses may therefore be desirable.

SUMMARY

A system and method for tagged interrupt forwarding is disclosed. In one embodiment the system comprises a multi-processor including a first and a second processor, an I/O device, and I/O management software. In response to an application I/O request, the I/O management software may be configured to prepare a request descriptor at the first processor. The request descriptor may include a tag identifying the first processor. After preparing the request descriptor, the I/O management software may send a hardware or device-level I/O request to the I/O device. When the I/O device completes the requested hardware I/O operation, it may send a response such as an interrupt signal, which may be received at the second processor. The response may be received at the second processor (i.e., rather than an the first processor) due to any of a variety of reasons. In some multiprocessor systems, for example, certain processors may be designated or dedicated to receive I/O interrupts from certain I/O devices. Alternatively, a processor may be selected at random or in accordance with an interrupt load-balancing policy to handle a given interrupt from an I/O device. I/O management software at the second processor may be configured to transfer control for processing the response back to the first processor at which the I/O request was initiated, using the tag within the request descriptor to identify the first processor. Processing of the response may then be completed at the first processor.

The translation of the application I/O request to a protocol-specific request descriptor may include several steps at various levels of the I/O management software (such as a file system level, one or more storage virtualization levels, and one or more device driver layers). At each level of I/O management software, dynamically allocated and/or static data structures related to the I/O request or to the targeted I/O device may be referenced, which may be brought into a cache hierarchy associated with the first processor. For example, a request header structure representing a state of the I/O request may be dynamically allocated, which may include a pointer to a function to be called when the I/O is completed, as well as an address of a buffer to be used for data transferred during the I/O operation. Static data structures may include structures representing device state, such as a partition table, statistical information related to the device, and/or a mutex lock. The completion of the processing of the response may include accessing one or more of the same dynamic and/or static data structures that were accessed during the preparation of the request descriptor (for example, the various layers of I/O management software traversed during request processing may be traversed in reverse order during response processing). The dynamic and/or static data structures may be accessed from a cache within the cache hierarchy associated with the first processor during response processing, thereby avoiding more expensive memory accesses that may have been required had the response processing been completed at the second processor. As part of response processing, one or more data structures that were dynamically allocated during request processing may also be freed or de-allocated at the first processor.

According to one embodiment, the I/O management software may be configured to maintain a completion queue array including one completion queue for each processor. When a response is received at the second processor from the I/O device, control may be passed to the first processor using a trap, such as a cross-processor or cross trap. A trap handler at the first processor may be configured to respond to the trap by enqueueing the request descriptor at a completion queue for the first processor and posting a soft interrupt at the first processor. A soft interrupt handler at the first processor may be configured to continue response processing, e.g., by invoking a callback routine with the request descriptor as a parameter.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
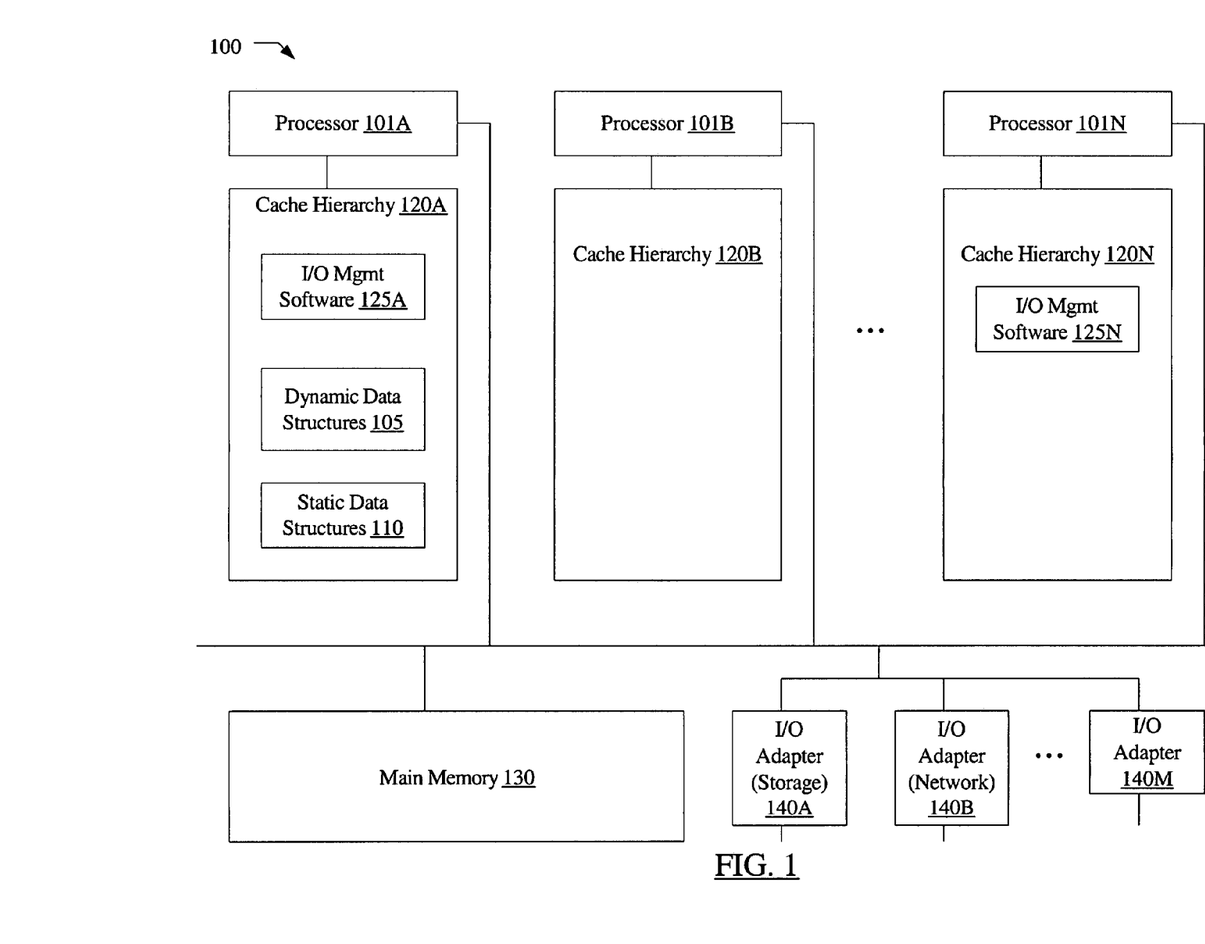
FIG. 1 is a block diagram illustrating a system according to one embodiment.

FIG. 1 is a block diagram of a system 100 according to one embodiment. System 100 includes a multiprocessor comprising a plurality of processors 101A, 101B, . . . 101N (which may be collectively referred to herein as processors 101) coupled to a main memory 130 and I/O adapters 140A-140M (collectively, I/O adapters 140). Each processor 101 has an associated cache hierarchy 120—e.g., cache hierarchy 120A for processor 101A, cache hierarchy 120B for processor 101B, etc.

System 100 may represent any of numerous kinds of computer configurations in different embodiments, such as a server, a desktop workstation, or a laptop. Processors 101 may implement a variety of architectures: for example, processors 101 may be ×86 processors, PowerPC™ processors or processors from the SPARC™ family of RISC processors. Main memory 130 may be implemented using any appropriate type of memory, such as various varieties of DRAM, SRAM, EDO RAM, or Rambus RAM. I/O adapters 140 may include one or more disk or other storage adapters (e.g., 140A), network adapters (e.g., 140B), display adapters, as well as adapters for various input devices such as a keyboard, a mouse, a trackball, a touch screen, etc. A storage I/O adapter 140A may allow the transfer of data to and from any of a variety of non-volatile storage devices, such as individual disk drives, disk arrays, intelligent storage devices, optical storage devices (such as CD-ROM, CD-RW, DVD-ROM, or DVD-RW devices), flash memory devices, and the like, using any appropriate storage protocol such as various variants of SCSI (Small Computer System Interface), IDE (Integrated Drive Electronics), Fibre Channel, etc. Similarly, a network I/O adapter 140B may allow the transfer of data to and from various kinds of network architectures, such as Ethernet, Token Ring, and the like. In some embodiments, storage devices such as disk arrays may also be accessed via network adapters, e.g., using the iSCSI (Internet SCSI) protocol. Storage devices accessible via storage I/O adapters 140 may be included within a chassis shared by processors 101 in some embodiments, and may be in a separate chassis or enclosure in other embodiments.

As shown in FIG. 1, each processor 101 may have an associated cache hierarchy 120. A cache hierarchy 120 may include one or more levels of caches, such as Level 1 (L1) caches, Level 2 (L2) caches, and Level 3 (L3) caches. In some embodiments, a separate instruction cache (ICache) and data cache (DCache) may be included within a given level of the cache hierarchy, while in other embodiments a combined data and instruction cache (I+D Cache) may be used. The different levels of caches within a cache hierarchy 120 may support different access latencies, and may contain caches of different sizes. For example, an L1 cache may provide the fastest access latency, and may typically be smaller than an L2 cache. Similarly, the latency of an access to an L2 cache may typically be smaller than the latency of an access to an L3 cache, and an L2 cache may be smaller than an L3 cache. The internal organization of individual caches within a given cache hierarchy 120 may also differ, e.g., in cache line size and/or cache set associativity. Access latencies to the slowest cache in a cache hierarchy 120 may typically be substantially faster than access latency to main memory 130 (e.g., sometimes by an order of magnitude or more). Any appropriate cache memory technology, such as any of various types of SRAM, may be used to implement cache hierarchies 120, as desired.

Data and/or instructions may be transferred among the levels of a cache hierarchy 120 and main memory 130 as needed by the corresponding processor 101. For example, in an embodiment employing L1 and L2 data caches, a first block of data needed by processor 101A may be copied by cache management hardware from main memory 130 into an L2 data cache within cache hierarchy 120A, and from the L2 data cache to the L1 data cache. As processor 101A executes further instructions, a second block of data may be required by processor 101A, and may be copied to the L2 data cache from main memory 130 in the event of an L2 cache miss (i.e., if it is not found in the L2 cache). Depending on various parameters such as the virtual addresses of the first and second blocks and the size and internal organization of the L1 data cache, the first block of data may be overwritten by the second block in the L1 data cache, or may co-exist with the second block within the L1 cache. If the first data block is "dirty" (i.e., if it has been updated in cache hierarchy 120A), it may be written to the L2 data cache and/or to main memory 130 prior to being overwritten in the L1 cache. Eventually, as further data accesses and/or updates occur, the first data block may be overwritten within the L2 data cache as well. If processor 101A again requires the first data block, it may have to be transferred again to the L1 cache from the L2 cache (if it remains in the L2 cache) or from main memory 130.

In addition, if a given data block is updated at another processor 101B, the local copy that may be stored within cache hierarchy 120A may be invalidated, e.g., using some appropriate cache coherency protocol. A subsequent request to access a data block that has been invalidated in the local cache hierarchy 120A may require a new main memory access. In one embodiment, such a request may result in an inter-processor cache transfer (i.e., a transfer of the current version of the requested data block directly from one cache hierarchy to another) rather than in a main memory access. Like accesses to main memory 130, inter-processor cache transfers may also be substantially more expensive than cache hits. That is, from a latency perspective, an inter-processor cache transfer may be considered equivalent to a main memory access. In the subsequent description, therefore, inter-processor cache transfers will not be discussed further, and a miss in a cache hierarchy will be described as resulting in a main memory access. It is noted that in embodiments employing instruction caches, transfers similar to those described above for data blocks may occur for instruction blocks (although instruction blocks may typically not be updated by a processor 101, or not updated as frequently as data blocks).

As processor clock speeds have increased rapidly in recent years, memory latency has typically not kept pace. During a memory access resulting from a cache miss, which may last for tens or hundreds of processor cycles in some architectures, a processor may stall and do no useful work. However, cache hierarchies 120 remain expensive relative to main memory 130, thereby limiting the size of caches that may be practicable to implement in typical computer systems. The impact of cache misses on overall system performance has therefore become significant for certain kinds of applications (e.g., applications that have a large working set size, such as many commercial applications).

Various techniques, such as compiler-level optimizations, have been implemented in an attempt to reduce cache miss rates. Many such techniques are applicable more to application or user-level code, rather than to system or kernel code. For example, while a database vendor may be able to modify application code or use compiler optimizations intended to reduce cache miss rates when compiling the database code, it may not be possible for the database vendor to use the same techniques on operating system code (e.g., it may not be possible to recompile the operating system). applicable to operating system code, rather than to user code. At the same time, operating systems have gradually incorporated more and more functionality, adding to the complexity of the code and the size of the operating system memory footprint. As an example, various levels of storage virtualization (such as volume managers and multiple file systems) and other abstraction layers have increased the code path length as well as the number of different data structures manipulated during I/O operations within operating systems. Consequently, for some classes of I/O intensive applications such as on-line transaction processing (OLTP) or electronic commerce applications, a substantial amount of time may be spent executing operating system code. A mechanism that improves the efficiency of I/O management software may therefore be desirable for such applications.

The term I/O management software, as used herein, generally refers to software configured to perform system-level operations required to satisfy a user-level I/O request. Thus, I/O management software may be configured to receive an application-level I/O request (e.g., a request from an application thread or process for a read or a write of a range of data within a file or a volume), create and/or manipulate various data structures to manage the I/O request within the operating system, translate the application-level I/O request into one or more hardware device-level I/O requests, issue the device-level I/O requests to the hardware device, receive responses such as interrupts from the hardware device, perform any processing required for the response, and return the requested data (for a read) or completion status (for a write) to the application. I/O management software may include part or all of one or more device drivers (including interrupt handlers) in some embodiments, and may also include part or all of other operating system layers such as volume managers and file systems in other embodiments.

In a multiprocessor system as depicted in FIG. 1, part or all of I/O management software 125 may be executed at any processor 101. As shown in FIG. 1, an instance of I/O management software 125A may be resident within cache hierarchy 120A for execution by processor 101A, while other instances (e.g., 125N) of I/O management software may be resident in other cache hierarchies (e.g., 120N) for execution by other processors (e.g., 101N). A complete copy of I/O management software (which may be termed I/O management software 125) may be resident on disk (such as a disk storing the code for the operating system used in system 100), and part or all of I/O management software may be resident in main memory 130 at any given time. A subset of I/O management software 125 (such as I/O management software 125A) may be brought into a cache hierarchy 120 from main memory 130 for execution by a processor 101 as needed. It is noted that the instances of I/O management software 125 resident at different cache hierarchies 120 may not be identical—i.e., the set of operations being performed by I/O management software 125A may differ from the set of operations being performed concurrently by I/O management software 125N.

Figure 2:
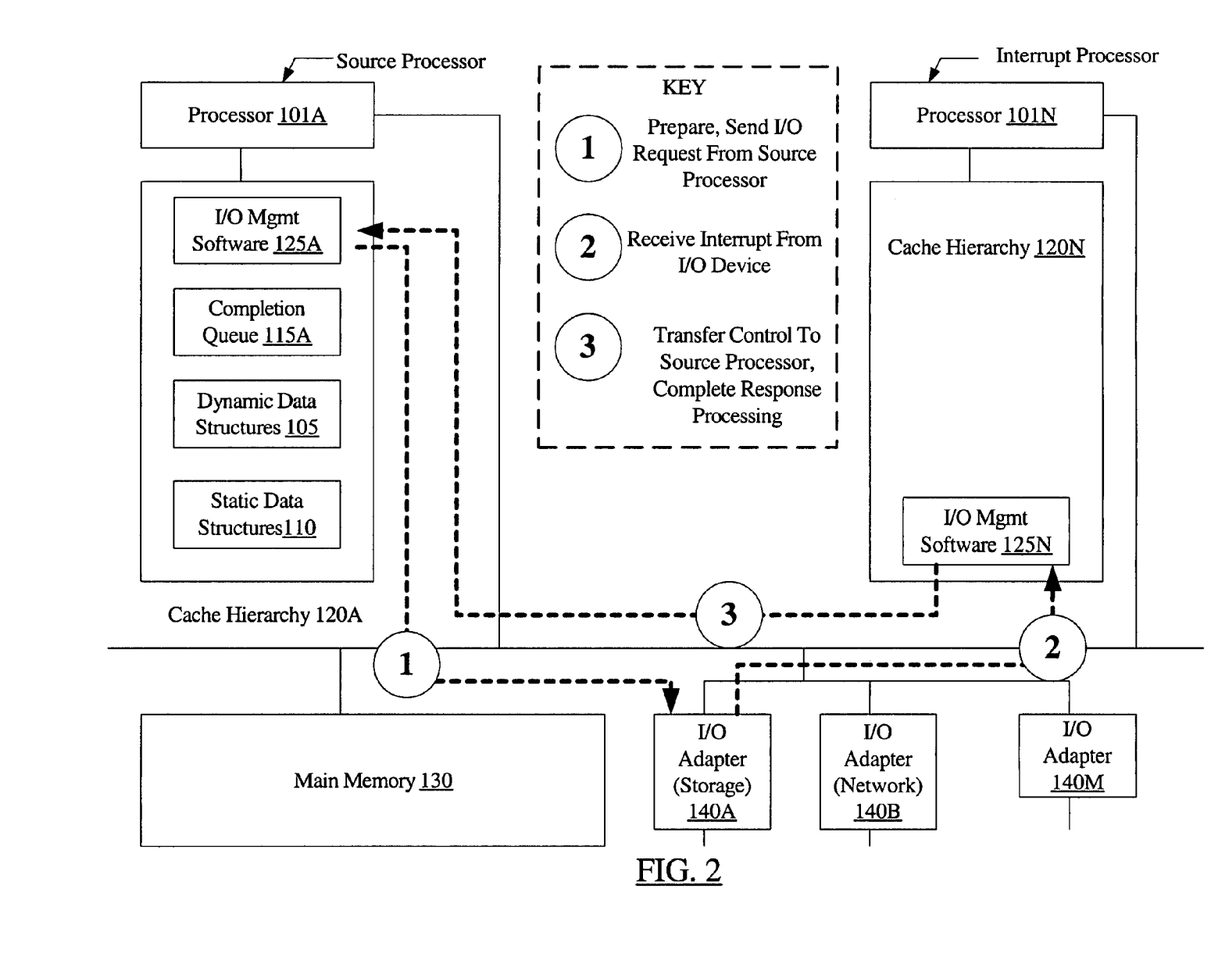
FIG. 2 is a block diagram illustrating a high-level view of functionality provided by I/O management software according to one embodiment.

FIG. 2 is a block diagram illustrating a high-level view of the functionality provided by I/O management software 125. The processing by I/O management software 125 in a computer system may logically be divided into two parts. A first part, illustrated by the arrow labeled "1" in FIG. 2, may include preparation and dispatch of a device-level I/O request to a hardware I/O device in response to a read or write request from an application. A second part, illustrated collectively by the arrows labeled "2" and "3" in FIG. 2, may include receiving a response, such as an interrupt, from the hardware I/O device and performing processing associated with the response, which may include returning a completion indication to the application. The first part may be termed "request processing", while the second part may be termed "response processing". Further details regarding the reasons for splitting response processing into two parts as shown in FIG. 2 (i.e., the parts illustrated by arrows "2" and "3" respectively), and the manner in which request and response processing may be implemented, are provided below.

In general, request processing and response processing for a single application I/O request may not be performed at the same processor 101 in a multiprocessor system. In some multiprocessor configurations, for example, an I/O interrupt handling policy may be in effect that directs I/O interrupts from a given I/O device (such as a storage I/O adapter 140A) to a specific processor such as an "interrupt processor" 101N. Different interrupt processors may be designated for different I/O devices in such configurations. In other multiprocessor architectures, the operating system may attempt to load-balance the I/O interrupt-handling workload; that is, the I/O interrupt-handling policy may attempt to distribute I/O interrupts from a given I/O device among all processors 101, or a specified subset of processors 101. Request processing, on the other hand, may be performed entirely or mostly at a source processor 101A (e.g., the processor at which an application thread or process requests the I/O operation). In large multiprocessor configurations, for example, a first subset of processors may be designated to handle application level processing such as database transactions, and a second subset of processors may be designated as interrupt processors. Any one of the first subset of processors may perform request processing for a given I/O request, while an I/O interrupt generated by the targeted I/O device may be handled by one of the interrupt processors. Even in a configuration where interrupts are distributed evenly among all processors 101 (e.g., where there are no dedicated interrupt processors), the probability that a source processor where an I/O request is initiated also handles the corresponding I/O interrupt may be quite low, especially as the total number of processors in the multiprocessor increases.

Figure 3:
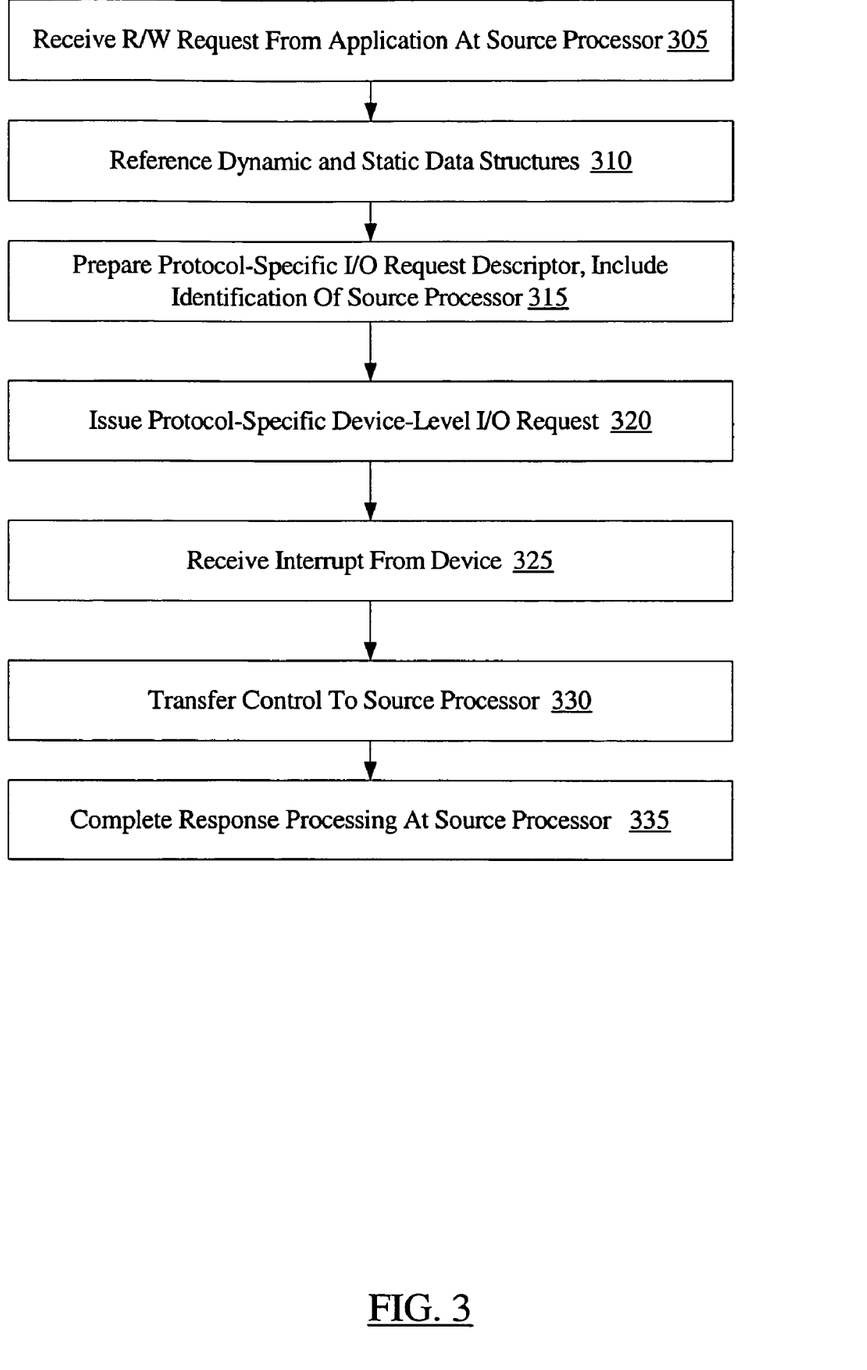
FIG. 3 is a flow diagram illustrating aspects of the operation of I/O management software according to one embodiment.

Several layers of an operating system may be traversed during both request processing and response processing, and various data structures may be accessed at each layer. FIG. 3 is a flow diagram illustrating aspects of the operation of I/O management software 125 at a high level according to one embodiment. I/O management software 125 may receive a read or a write request from an application at a source processor 101A (block 305 of FIG. 3). For example, a user may generate a database access or update request (e.g., using a graphical user interface or a text interface) that is translated into an SQL (Structured Query Language) query by a component of a database management system. A database application thread or process at processor 101A may then invoke a system call for a read or write request corresponding to the SQL request (often, numerous system calls may be generated for a single SQL query). It is noted that the equivalent of a read or write system call may also be generated in response to internal, operating-system-initiated, I/O operations (such as configuration management operations), and that the following description applies to such internal I/O operations as well as to application-initiated I/O operations.

In response to the system call, the operating system may reference two kinds of data structures (block 310): dynamically allocated structures 105 (shown in FIG. 1, FIG. 2) such as one or more per-request structures that may be discarded or freed during response processing, as well as more permanent data structures that may remain after the response processing completes. Such more permanent data structures, including static data structures and dynamic data structures that remain allocated for a long period relative to the duration of an I/O request and response, may be collectively referred to herein as static data structures 110. The dynamic data structures 105 may, for example, include state information for the I/O request, while the static data structures 110 may include state information for a device or a class of devices (which may be software devices representing a virtual view of underlying hardware I/O devices). Static data structures 110 representing a state of a device may include, e.g., a software copy of a device control register, statistical information such as queue lengths, a mutex that may be held during access to the hardware device, a partition table or a unit structure. Both the dynamic and the static data structures may be brought into cache hierarchy 120A of source processor 101A where request processing is performed. As described below in conjunction with the description of FIG. 4, the dynamic data structure or structures 105 may, for example, include a pointer to a buffer used for storing the data associated with the I/O request, a callback function, and various other request-specific information. The static data structures 110 may include a variety of information, e.g., including I/O performance and/or failure statistics, related to the state of a group or class of I/O devices to which the targeted I/O device may belong. Pointers to the dynamic and/or static data structures may be passed to lower layers of I/O management software (e.g., at one layer, a file name and a file offset for a read operation may be translated into a logical volume identifier and a block offset within the logical volume). At each storage virtualization layer, additional layer-specific dynamic and/or static data structures may also be referenced.

Both the dynamic and static data structures (105 and 110, respectively) may need to be accessed during response processing as well as during request processing. If the I/O device completes hardware I/O processing fast enough, the dynamic and static data structures may remain largely or completely resident in cache hierarchy 120A when the I/O device generates an interrupt indicative of a completion of hardware I/O processing. In order to take advantage of the cache residency of the dynamic and static data structures 105 and 110, I/O management software 125 may be configured to retain information identifying the source processor 101A in a location accessible to interrupt-handling code (e.g., by "tagging" an I/O request descriptor), and may make use of this identification to complete response processing at source processor 101A, as described below.

After passing through various layers of I/O management software 125, the I/O request may ultimately reach a layer at which the targeted hardware device and associated I/O protocols (e.g., SCSI or Fibre Channel) are identified. Such a layer of I/O management software 125 may be configured to prepare a protocol-specific I/O request descriptor for the I/O request during request processing. The protocol-specific I/O request descriptor may be used to enqueue or issue a hardware I/O request, and may also be used to respond to the subsequent I/O interrupt, thereby providing a mechanism for transferring information between the I/O code path used for request processing and the I/O code path used for response processing. I/O management software 125 may therefore be configured to include a special tag including an identification of the source processor 101A in the protocol-specific request descriptor (block 315) prior to issuing the protocol-specific, device-level I/O request (block 320). The identification of source processor 101A may be implemented using a variety of techniques in different embodiments, such as a simple numerical encoding (e.g., "0" for processor 101A, "1" for processor 101B, etc.), or an indirect encoding such as an address within an array of structures, where each structure of the array corresponds to a specific processor 101. An example of such an indirect encoding (using a completion queue array mechanism) is also provided below in conjunction with the description of FIG. 4.

The targeted hardware I/O device may then perform the requested protocol-specific I/O request (e.g., a first storage device such as storage I/O adapter 140A may send a request to a second storage device such as a disk using a SCSI command, and receive a response from the disk) and generate an I/O interrupt. I/O management software 125N at an interrupt processor (such as 101N) may receive the I/O interrupt (block 325, arrow "2" of FIG. 2). As described above, processor 101N may be selected for interrupt handling based on any of a variety of interrupt handling policies in different embodiments. If the interrupt processor 101N differs from the source processor 101A, I/O management software 125N may quickly transfer control for response processing to source processor 101A (block 330 of FIG. 3, arrow "3" of FIG. 2) in order to take advantage of the likely residency of the dynamic and static data structures 105 and 110 within cache hierarchy 120A as described above. The remainder of response processing (which may include both protocol-specific processing and processing at higher layers of I/O management software 125) may then be completed at source processor 101A (block 335). Each layer of I/O management software that was traversed during request processing may be traversed in reverse order during response processing. Manipulation of the dynamic and static data structures for each layer that may be found in cache hierarchy 120A may be accomplished without expensive main memory accesses, thereby improving overall system efficiency. Finally, before returning the requested data (for a read operation) or a completion indication (for a write operation) to the application process or thread, the dynamically allocated data structures 105 may be freed or deallocated.

Figure 4:
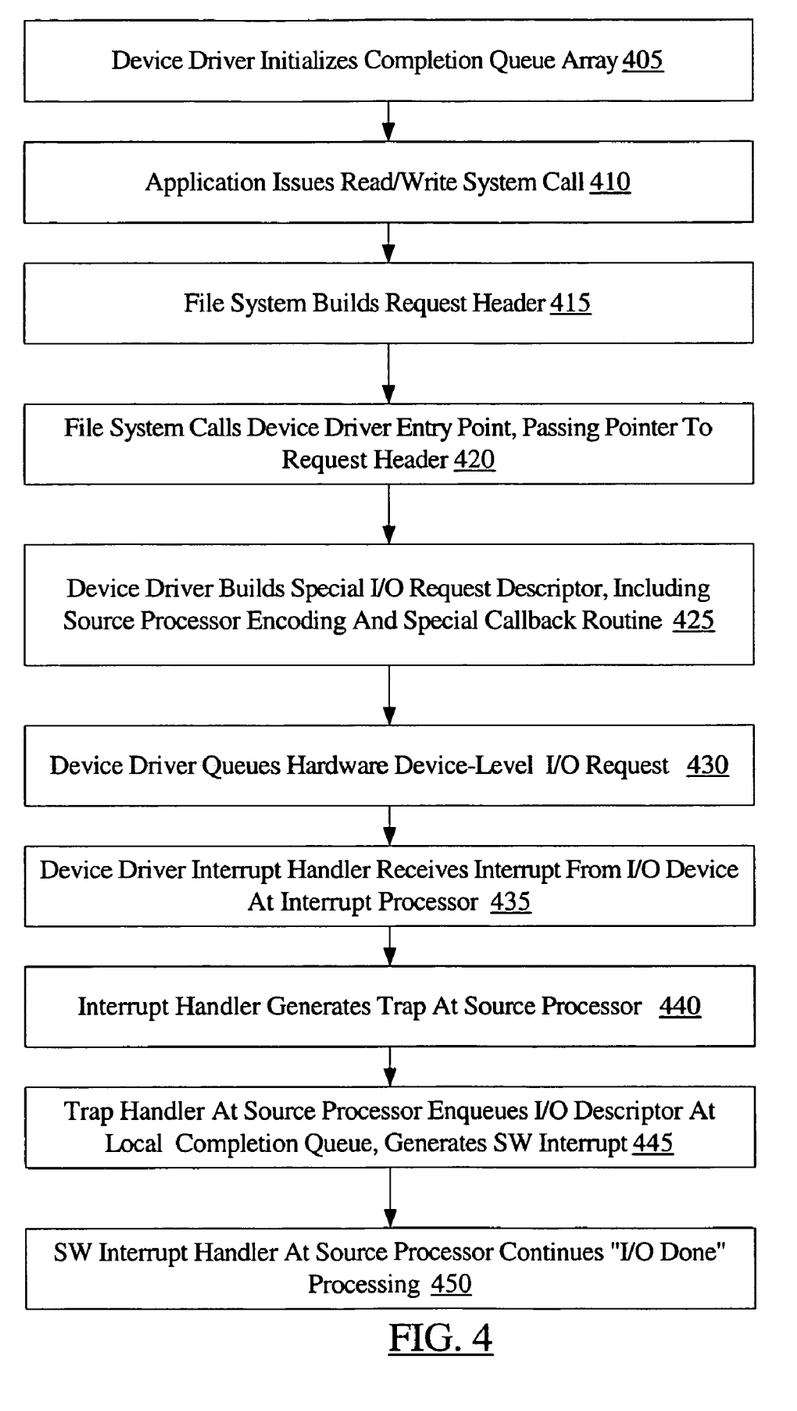
FIG. 4 is a flow diagram illustrating details of the operation of I/O management software according to one embodiment.

FIG. 4 is a flow diagram, illustrating further details of the operation of I/O management software 125 in response to an I/O request according to one embodiment. In the illustrated embodiment, a device driver layer of I/O management software 125 is configured to create and initialize an array of completion queues (block 405), with one completion queue for each processor. Each completion queue, such as completion queue 115A shown resident in cache hierarchy 120A in FIG. 2, is used to temporarily hold protocol-specific I/O descriptors during response processing for I/O requests generated at the corresponding processor 101, as described below. The completion queue array may be initialized at system initialization time (e.g., when the multiprocessor boots up) in some embodiments, or at some other time such as device initialization time prior to a commencement of application I/O activity.

After the application process or thread issues a read or write system call (block 410) for a block of data within a file, a file system layer of I/O management software 125A at source processor 101A builds a dynamically allocated request header for the requested data (block 415). The request header (which may also be termed a "block request header" if the device being accessed is a block-structured device) may correspond to the dynamic data structures 105 illustrated in FIG. 1 and FIG. 2. One or more such request headers may be allocated for each I/O request (e.g., depending on the size of the requested I/O operation, in some cases multiple request headers may be used for a single application-level I/O operation). A variety of information may be included within the request header, in a variety of formats, in different embodiments. In some UNIX™-like operating systems, for example, request header 500 may be implemented in the form of a data structure called "buf".

Figure 5:
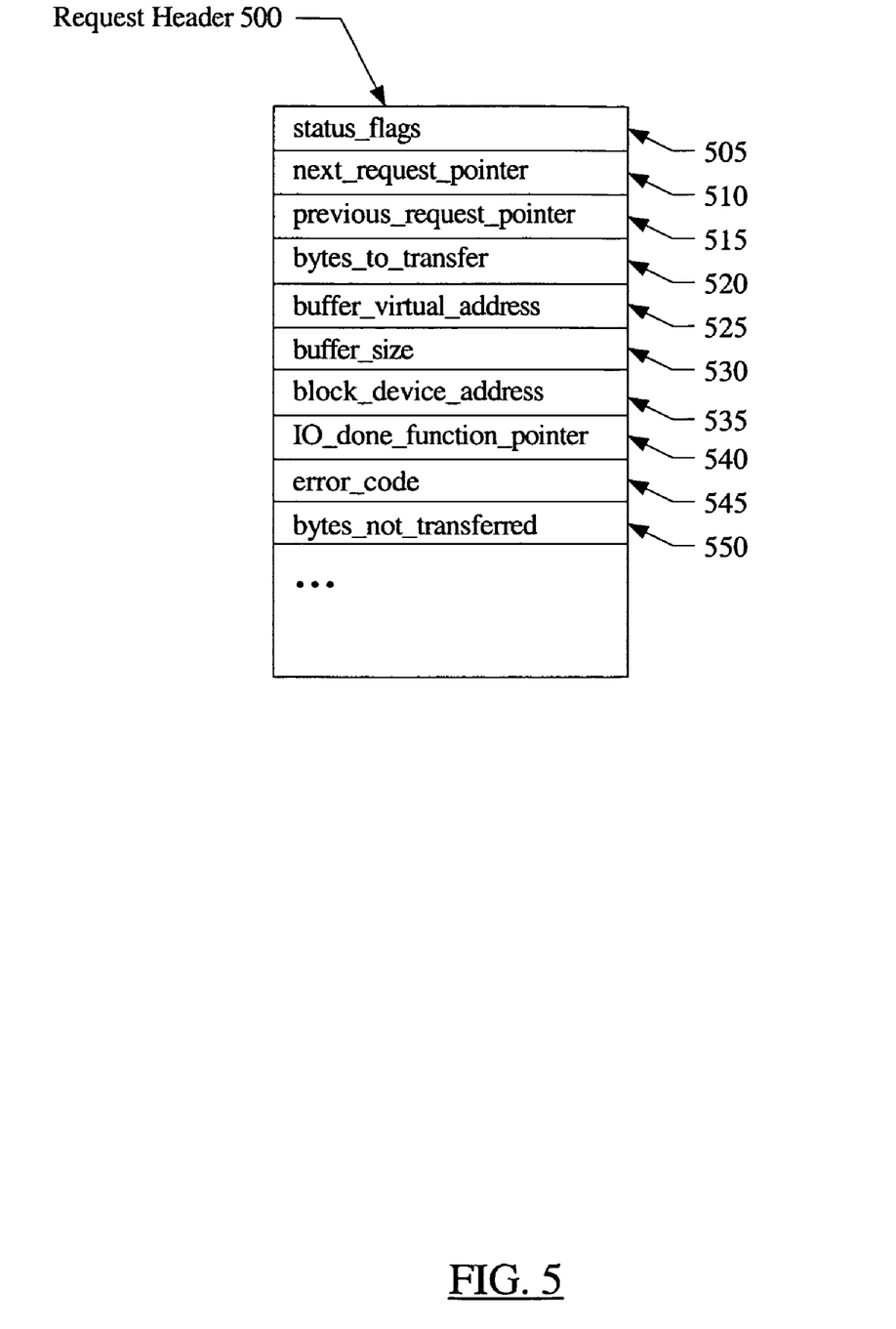
FIG. 5 is a block diagram illustrating fields included within an exemplary request header according to one embodiment.

FIG. 5 is a block diagram illustrating various fields included within an exemplary request header 500 according to one embodiment. In the depicted embodiment, a status_flags field 505 may encode status information for the I/O request, such as whether the I/O request is a read or a write, whether the I/O is currently in progress (i.e., whether the request header is "busy" or "in_use"), etc. Next_request_pointer 510 and previous_request_pointer 515 may be used to chain multiple requests together, e.g., in order to support more efficient ordering of I/O requests. The number of bytes to transfer may be specified using bytes_to_transfer field 520, and the virtual address of a buffer to which (for a read) or from which (for a write) the transfer is to take place may be specified using buffer_virtual_address field 525. The size of the buffer specified by buffer_virtual_address 525 may be indicated via buffer_size field 530. The targeted block address (e.g., a logical identifier of the targeted device such as a device number, and a logical offset for the requested block within the targeted device) may be encoded using one or more block_device_address fields 535. A pointer to a function to be called when the I/O is complete (which may be called an "I/O Done" function) may be included in the IO_done_function_pointer 540. The I/O Done function may, for example, include code to wake up the requesting thread or process when the requested data has been successfully read or written. Several fields related to error handling, such as an error_code field 545 indicative of a type or cause of an error, and a bytes_not_transferred field 550, indicative of the number of bytes remaining to be transferred in the event of an error, may also be included. A variety of other information related to the I/O request may also be stored in a request header 500 in other embodiments, and some of the illustrated information may be excluded or represented using a different combination of fields.

The file system layer of I/O management software 125A may then call a device driver entry point, passing a pointer to the request header 500 during the call (block 420 of FIG. 4). The device driver layer or layers of I/O management software 125 may be implemented in a variety of ways in different embodiments. For example, in some UNIX™-based operating systems, the device driver entry point may be implemented as a "strategy" routine (such as "scstrategy" for SCSI devices). As noted above, in some embodiments, one or more additional layers of I/O management software 125A, such as a logical volume manager layer, may also be traversed between a file system layer and a device driver layer. The device driver layer may be configured to use the block_device_address field or fields 535 of request header 500 to obtain device state information for the targeted I/O device. Such device state information may correspond to the static data structures 110 described earlier. The device state information may, for example, include information shared by different devices of a specific type (such as a maximum size of a SCSI disk device) as well as statistics on successful operations performed on that type or class of device (e.g., the number of I/Os performed during a specified interval) and any failures that may have occurred during accesses to that type of device (such as the number of write errors during a specified period). The device driver layer may then validate additional fields of the request header 500, for example by checking that the address of the requested block (as specified by block_device_address fields 535) lies within a valid range (e.g., as specified by the maximum size in the device state information).

The device driver layer of I/O management software 125A may then build a tagged I/O request descriptor for the protocol-specific hardware I/O operation (block 425). In order to take advantage of the caching of the request header 500 and device state information at cache hierarchy 120A as described above, the I/O request descriptor may include a tag identifying source processor 101A, and may also include a pointer to a special callback routine configured to transfer control back to source processor 101A in response to an interrupt from the targeted I/O device. It is noted that in some embodiments, more than one device driver layer may be included within I/O management software 125 for a single I/O device 140 (e.g., for SCSI devices, a "target" device driver layer may be employed on top of a "host bus adapter (HBA)" device driver layer) and different fields of the I/O request descriptor may be filled in by different device driver layers. It is also noted that DMA (Direct Memory Access) techniques may be used for data transfer to or from hardware devices in one embodiment, and the device driver layer or layers of I/O management software 125 may be configured to prepare one or more resources (such as buffers) for DMA during request processing in such embodiments.

Figure 6:
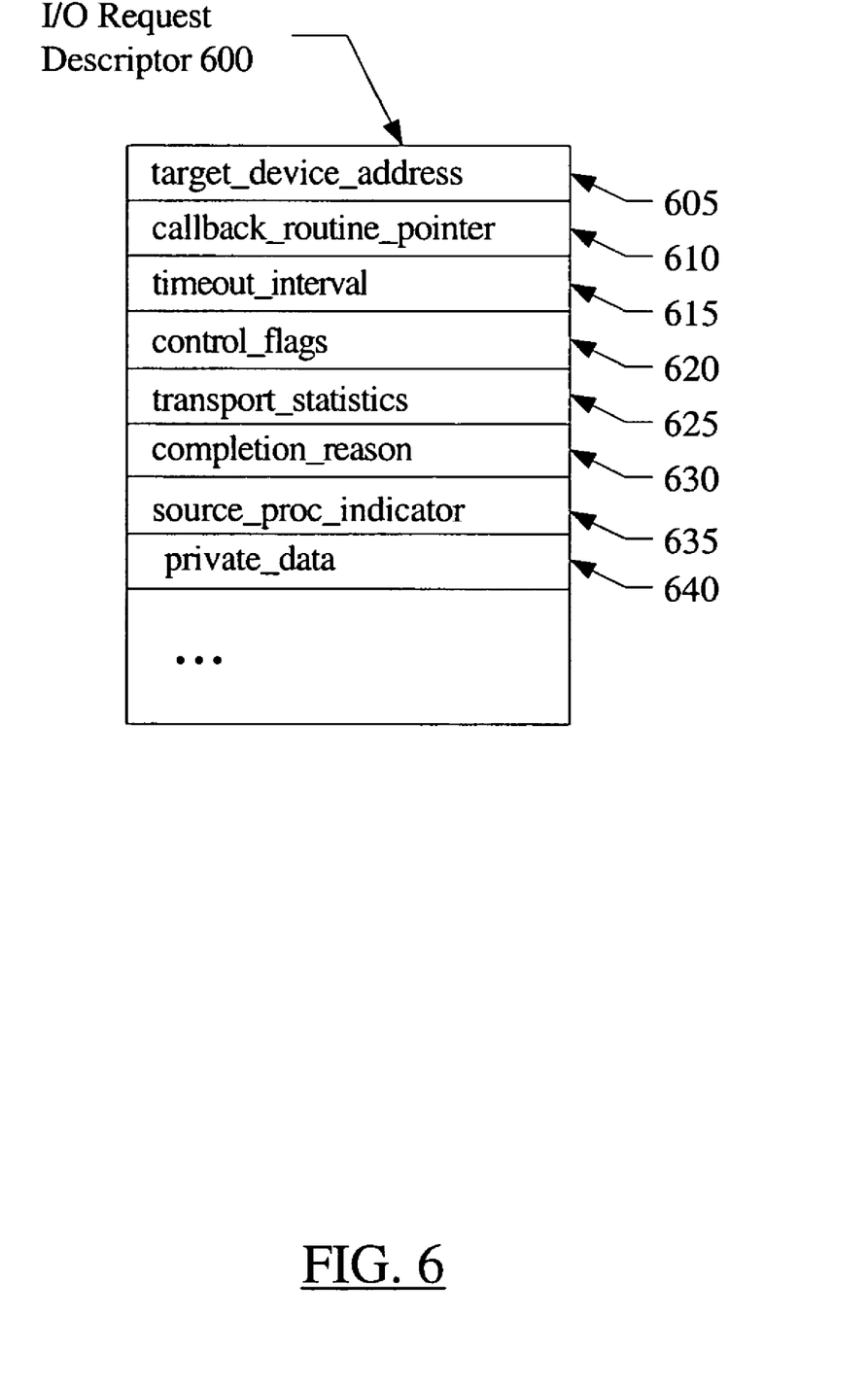
FIG. 6 is a block diagram illustrating an exemplary I/O request descriptor according to one embodiment.

FIG. 6 is a block diagram illustrating an exemplary I/O request descriptor 600 that may be prepared in the step illustrated in block 425 according to one embodiment. In the illustrated request descriptor 600, the target device may be identified using the target_device_address field 605. A callback_routine_pointer field 610 may contain a pointer to the special callback routine described above. For example, in one embodiment, when an HBA device driver layer has transported a SCSI command to the target SCSI device, and the SCSI command has either completed or can make no further progress, the HBA device driver layer may invoke the callback routine specified by field 610 with the request descriptor 600 as a parameter. If a multi-layer device driver is being used, an upper layer (e.g., a target device driver layer) may specify a callback routine for a lower layer (e.g., an HBA device driver layer). A timeout_interval field 615 may be used to specify a maximum time that may be taken to perform the hardware I/O command, after which the callback routine may be invoked (a special value such as zero may be used for timeout_interval to indicate that no timeout is required). A control_flags field or fields 620 may be used to specify various details related to the specific I/O protocol being used, such as whether data parity is to be checked during data transfer, whether the hardware command is to be placed at the head or the tail of a queue, etc. A transport_statistics field 625 may be used to specify whether the command included a synchronous or asynchronous data transfer, whether the device was reset, etc.

A completion_reason field 630 may be used to specify why the request corresponding to descriptor 600 was terminated, e.g., whether the request was terminated due to successful completion, a requested abort, a data overrun, etc. A source_proc_indicator field 635 may be used as a tag encoding or identifying source processor 101A. For example, the encoding may include the address of completion queue 115A for source processor 101A, a numerical identification of processor 101A, or a combination of completion queue information and processor identification. Finally, one or more private fields such as private_data 640 may be included for manipulation by corresponding sublayers of a device driver layer (such as a target layer and an HBA layer for SCSI devices). In some embodiments, a pointer to the request header 500 may be stored within a private_data field 640. It is noted that numerous other fields may be included in an I/O request header 600 in different embodiments employing any suitable I/O protocol (e.g., Fibre Channel specific fields may be included in an embodiment employing Fibre Channel protocols, additional SCSI-related fields may be included in various versions of SCSI request descriptors such as "scsi_pkt" descriptors, etc.). In some embodiments, the constituent information of an I/O request header may be arranged in a different combination of fields than those illustrated in FIG. 6.

A device driver layer of I/O management software 125A may then queue or issue a hardware or device-level I/O request (block 430). The targeted hardware I/O device may then perform the requested I/O operation and generate an interrupt. An interrupt handler, e.g., within a device driver layer of I/O management software 125N, may receive the interrupt at an interrupt processor 101N (block 435). The special callback routine identified by callback_routine_pointer 610 may then be invoked at interrupt processor 101N by the interrupt handler. The special callback routine may be configured to inspect the contents of source_proc_indicator field 635 to identify the source processor 101A where the I/O request originated. If the source processor descriptor 101A differs from the interrupt processor 101N, the interrupt handler may generate a cross trap (which may also be termed a cross-processor trap) to transfer control of subsequent response processing to source processor 101A (block 440). A trap handler within I/O management software 125A may then be activated, which may enqueue the I/O request descriptor 600 for the just-completed hardware I/O operation at completion queue 115A (block 445), and post a software interrupt at processor 101A. A software interrupt handler within I/O management software 125A may then invoke one or more additional callback routines, passing the request descriptor as a parameter. Control for continued response processing may then be returned back to upper layers (e.g., a logical volume layer or a file system layer) of I/O management software 125A. During response processing, one or more fields of the static device information (data structures 110) may be modified, such as fields including statistics on the number of completed operations. Dynamically allocated data structures such as request header 500 may be accessed during response processing, for example to obtain the virtual address of a buffer to receive the transferred data for a read request. In addition, the dynamically allocated data structures such as request header 500 (and/or DMA-related resources) may also be freed or de-allocated during response processing. After response processing at one or more intermediate layers of I/O management software 125A, the I/O done function identified by the IO_done_function_pointer field 540 of request header 500 may be invoked at source processor 101A. Both the dynamic and static data structures 105 and 110 be accessed during the response processing at processor 125A may be obtained from cache hierarchy 120A if the data structures have not been displaced from the cache since request processing completed.

It is noted that the speed with which I/O devices (such as I/O adapters 140 and associated storage devices such as disks) respond to a hardware I/O request may impact the likelihood that some or all of dynamic and static data structures 105 and 110 may remain resident in cache hierarchy 120A during response processing. For example, in one specific implementation, if an L2 cache can hold 8 MB (megabytes) of data, and the average rate at which data is displaced or removed from the L2 cache is 100 MB/second, then if a hardware I/O operation is completed within 10 milliseconds, ((10 ms/1000 ms)*100 MB) or 1 MB of the 8 MB of cached data may be expected to be displaced by the time response processing begins. Thus, in such an implementation, the probability of a given block of data (such as a portion of the dynamic data structures 105 or static data structures 110) remaining resident at cache hierarchy 120A between the time at which request processing is completed, and the time at which response processing begins, may be quite high. In the example described above, 7 MB of the 8 MB of data that existed within the cache hierarchy 101A when request processing completed may still be expected to be resident when response processing begins. If the hardware I/O operation took 50 milliseconds, however, 5 MB of the 8 MB of data cached in the L2 cache may already have been displaced by the time response processing is initiated, thereby reducing the chances of being able to find the dynamic or static data structures in cache. If the hardware operation took more than 80 milliseconds in this example, the probability of finding any of the data structures manipulated during request processing resident in cache at the start of response processing may be lower still.

In some embodiments, therefore, I/O management software 125 may be configured to take hardware I/O completion time into account, and to transfer control for response processing back to source processor 101N only if the hardware I/O completion time is less than a specified threshold. For example, the I/O request descriptor 600 may include a timestamp field indicating when the request processing was completed and a maximum_delay field indicating the maximum acceptable delay for the hardware I/O operation. The special callback routine identified by callback_routine_pointer 610 may then check whether the time taken for the interrupt to arrive is within the specified maximum delay, and may not transfer control to source processor 101A if the maximum delay has been exceeded. The maximum acceptable delay may be supplied as a parameter to I/o management software 125 in some embodiments (e.g., via a system configuration file by a system administrator).

The functionality described above for I/O management software 125 may generally result in increased "fairness" in I/O-related processing distribution, in that the processor responsible for initiating an I/O request may be used for completing most of the response processing related to the request. In some high-performance configurations of system 100 (e.g., benchmark testing configurations or heavily loaded production environments), the decision to transfer control back to the source processor may also be influenced by the processor utilization at the source and interrupt processors. For example, if the source processor 101A is known to be very heavily utilized (e.g., with a consistent processor utilization of 90% or above), while the interrupt processor 101N is known to be relatively lightly utilized (e.g., with a consistent processor utilization of 50%), then it may not be advisable to transfer the additional burden of completing response processing to the source processor, despite the potential caching benefits. In some embodiments, therefore, one or more mechanisms to disable the transfer of control by I/O management software 125N from an interrupt processor 101N to a source processor 101A may be implemented. For example, in one embodiment, a special value of the maximum_delay field described above (e.g., zero) may be used to ensure that additional load is not transferred back to a busy source processor. In another embodiment, an environment variable or directive may be used for the same purpose. In some embodiments, an adaptive technique may be employed, wherein I/O management software 125 may maintain statistics on the utilization level at each processor 101, and may use such statistics to determine whether response processing for a given I/O request is transferred back to the source processor for the I/O request or not. In one such embodiment, for example, depending on the nature of the specific I/O request and the current utilization levels at specific interrupt processors and specific source processors, I/O management software 125 may not include an identification of the source processor (e.g., using source_proc_indicator 635) for a subset of I/O requests.

In general, the techniques described above may be used to manage I/O processing for various kinds of I/O devices, such as storage devices, network devices, etc., for both synchronous and asynchronous I/O operations. In some embodiments, for example to manage completion processing of asynchronous operations, an identification of a requesting thread (i.e., the thread that initiated the asynchronous I/O request) may be maintained in the request descriptor 600, in addition to or in place of an identification of a source processor such as source_proc_indicator 635. The identification of the requesting thread may be used in such embodiments, for example, to transfer completion processing to the processor where the requesting thread is currently executing. For certain relatively slow I/O devices (e.g., keyboards or mice), where the advantages of transferring response processing back to a source processor 101A may be relatively small, I/O management software may be configurable to disable tagging of I/O request descriptors in some embodiments. In one embodiment, the transfer of completion processing may be enabled only for successful I/O operations, i.e., completion processing for an I/O operation that results in an error may not be transferred to the source processor.

The techniques described above generally implement the functionality of transferring control for response processing to the source processors where the I/O request originated. In one alternative embodiment, instead of transferring response processing responsibilities, I/O management software 125 may be configured to transfer a portion or all of request processing responsibilities from source processor 101A to an interrupt processor 101N. In such an embodiment, for example, as soon as a read or write system call is received, I/O management software 125A may identify an interrupt processor 101N for the requested I/O operation, and may transfer control to the interrupt processor for the remaining request processing and response processing. Any data structures allocated or accessed during request processing may remain resident in cache hierarchy 120N at the interrupt processor when response processing begins, thereby improving the efficiency of I/O processing by limiting the number of main memory accesses required.

It is noted that I/O management software 125 may be implemented using any suitable programming language such as C, C++, Java and the like in different embodiments. It is also noted that in some embodiments, I/O management software 125 may utilize the techniques described above for only a subset of the I/O requests received at system 100 rather than for all I/O requests. Portions of I/O management software 125 may reside within existing layers of an operating system, such as one or more device driver layers, logical volume management layers, file system layers, and the like in some embodiments, and may be implemented as stand-alone programs in other embodiments. Instructions corresponding to I/O management software 125 may be stored in any suitable computer-accessible medium. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a multiprocessor including a first and a second processor;
an I/O device; and
I/O management software;
wherein the I/O management software is configured to:
prepare a request descriptor at the first processor in response to an application I/O request, wherein the request descriptor includes an identification of the first processor;
send a device-level I/O request to the I/O device from the first processor;
receive a response to the device-level I/O request from the I/O device at the second processor;
after receiving the response at the second processor, identify the first processor from the identification and transfer control for processing of the response to the first processor from the second processor using a trap; and
complete processing of the response at the first processor, wherein completing the processing of the response includes posting a soft interrupt at the first processor.

2. The system as recited in claim 1, wherein the I/O management software is further configured to access one or more data structures stored in a cache associated with the first processor while completing the processing of the response.

3. The system as recited in claim 2, wherein a data structure of the one or more data structures is dynamically allocated by the I/O management software prior to a preparation of the request descriptor.

4. The system as recited in claim 2, wherein a data structure of the one or more data structures includes information indicative of a state of the I/O device.

5. The system as recited in claim 2, wherein a data structure of the one or more data structure includes information associated with one or more storage virtualization layers.

6. The system as recited in claim 1, wherein the I/O management software is further configured to maintain a completion queue for each processor of the multiprocessor.

7. The system as recited in claim 6, wherein the I/O management software is further configured to enqueue the request descriptor at a first completion queue corresponding to the first processor while completing the processing of the response.

8. The system as recited in claim 7, wherein the I/O management software includes a soft interrupt handler, wherein the soft interrupt handler is configured to pass the descriptor to a callback function at the first processor in response to a posting of the soft interrupt.

9. The system as recited in claim 1, wherein the processing of the response includes a deallocation of a data structure previously allocated by the I/O management software at the first processor.

10. A method comprising:
receiving an I/O request at a first processor of a multiprocessor;
preparing a request descriptor at the first processor, wherein the request descriptor includes an identification of the first processor;
sending a device-level I/O request to an I/O device from the first processor;
receiving a response to the device-level I/O request from the I/O device at a second processor of the multiprocessor;
after receiving the response at the second processor, identify the first processor from the identification and transfer control for processing of the response to the first processor from the second processor using a trap; and
completing processing of the response at the first processor, wherein completing the processing of the response includes posting a soft interrupt at the first processor.

11. The method as recited in claim 10, wherein completing the processing of the response comprises accessing one or more data structures stored in a cache associated with the first processor.

12. The method as recited in claim 11, wherein a data structure of the one or more data structures is dynamically allocated prior to a preparation of the request descriptor.

13. The method as recited in claim 11, wherein a data structure of the one or more data structures includes information indicative of a state of the I/O device.

14. The method as recited in claim 11, wherein a data structure of the one or more data structure includes information associated with one or more storage virtualization layers.

15. The method as recited in claim 10, further comprising maintaining a completion queue for each processor of the multiprocessor.

16. The method as recited in claim 15, wherein completing the processing of the response at the first processor comprises enqueuing the request descriptor at a first completion queue corresponding to the first processor.

17. The method as recited in claim 16, further comprising passing the descriptor to a callback function at the first processor in response to the posting of the soft interrupt.

18. The method as recited in claim 10, wherein completing the processing of the response includes deallocating a data structure previously allocated at the first processor.

19. A computer-accessible storage medium storing program instructions, wherein the program instructions are executable to:
receive an I/O request at a first processor of a multiprocessor;
prepare a request descriptor at the first processor, wherein the request descriptor includes an identification of the first processor;
send a device-level I/O request to an I/O device from the first processor;
receive a response to the device-level I/O request from the I/O device at a second processor of the multiprocessor;
after receiving the response at the second processor, identify the first processor from the identification and transfer control for processing of the response to the first processor from the second processor using a trap; and
complete processing of the response at the first processor, wherein completing the processing of the response includes posting a soft interrupt at the first processor.

20. The computer-accessible storage medium as recited in claim 19, further storing program instructions executable to access one or more data structures stored in a cache associated with the first processor while completing the processing of the response.

21. The computer-accessible storage medium as recited in claim 20, further storing program instructions executable to dynamically allocate a data structure of the one or more data structures prior to a preparation of the request descriptor.

22. The computer-accessible storage medium as recited in claim 20, wherein a data structure of the one or more data structures includes information indicative of a state of the I/O device.

23. The computer-accessible storage medium as recited in claim 20, wherein a data structure of the one or more data structure includes information associated with one or more storage virtualization layers.

24. The computer-accessible storage medium as recited in claim 19, further storing program instructions executable to maintain a completion queue for each processor of the multiprocessor.

25. The computer-accessible storage medium as recited in claim 24, further storing program instructions executable to enqueue the request descriptor at a first completion queue corresponding to the first processor while completing the processing of the response.

26. The computer-accessible storage medium as recited in claim 25, further storing program instructions executable to pass the descriptor to a callback function at the first processor in response to the posting of the soft interrupt.

27. The computer-accessible storage medium as recited in claim 19, wherein completing the processing of the response includes deallocating a data structure previously allocated at the first processor.

* * * * *

UNITED STATES PATENT AND TRADEMARK OFFICE
CERTIFICATE OF CORRECTION

| | | |
|---|---|---|
| PATENT NO. | : 7,702,835 B2 | |
| APPLICATION NO. | : 11/050076 | |
| DATED | : April 20, 2010 | |
| INVENTOR(S) | : Paul A. Riethmuller | |

It is certified that error appears in the above-identified patent and that said Letters Patent is hereby corrected as shown below:

In column 13, line 30, delete "I/o" and insert -- I/O --, therefor.

Signed and Sealed this
Twelfth Day of April, 2011

David J. Kappos
*Director of the United States Patent and Trademark Office*